US008417411B2

(12) United States Patent
Dlugoss

(10) Patent No.: US 8,417,411 B2
(45) Date of Patent: Apr. 9, 2013

(54) TORQUE SENSOR PERFORMANCE DIAGNOSTIC SYSTEMS AND METHODS

(75) Inventor: Randall B. Dlugoss, Royal Oak, MI (US)

(73) Assignee: GM Global Technology Operations LLC

( * ) Notice: Subject to any disclaimer, the term of this patent is extended or adjusted under 35 U.S.C. 154(b) by 746 days.

(21) Appl. No.: 12/548,014

(22) Filed: Aug. 26, 2009

(65) Prior Publication Data

US 2010/0274443 A1 Oct. 28, 2010

Related U.S. Application Data

(60) Provisional application No. 61/171,625, filed on Apr. 22, 2009.

(51) Int. Cl.
*G01M 17/00* (2006.01)

(52) U.S. Cl.
USPC .............. 701/29.1; 701/31.4; 701/51; 701/61; 701/87; 702/183; 702/184; 702/185; 475/216; 475/123; 475/231; 477/5; 477/107; 477/115; 477/125; 477/906

(58) Field of Classification Search ..................... 701/43, 701/29.2, 51, 29.1, 61, 87, 95, 31.4; 702/183, 702/184; 475/231, 216, 123; 477/5, 107, 477/115, 125, 30, 906
See application file for complete search history.

(56) References Cited

U.S. PATENT DOCUMENTS

| 3,878,414 | A | * | 4/1975 | Harakawa | ................ 310/156.62 |
| 4,495,449 | A | * | 1/1985 | Black et al. | ..................... 318/60 |
| 4,918,744 | A | * | 4/1990 | Shimizu | ........................ 388/833 |
| 5,304,912 | A | * | 4/1994 | Kajiwara et al. | .............. 318/802 |
| 5,487,004 | A | * | 1/1996 | Amsallen | ........................ 701/51 |
| 5,593,109 | A | * | 1/1997 | Williams | ..................... 244/3.21 |
| 5,938,712 | A | | 8/1999 | Kbamoto et al. | |
| 6,196,078 | B1 | * | 3/2001 | DeJonge et al. | ........... 74/473.12 |
| 6,397,152 | B1 | | 5/2002 | Kalweit et al. | |
| 6,553,958 | B1 | | 4/2003 | Kolmanovsky et al. | |
| 7,111,611 | B1 | | 9/2006 | Lyon | |
| 7,559,405 | B2 | * | 7/2009 | Kumaido et al. | .............. 180/446 |
| 7,593,796 | B2 | | 9/2009 | Prokorov | |
| 7,635,317 | B2 | | 12/2009 | Petzold | |
| 2003/0206042 | A1 | * | 11/2003 | Walker et al. | ................. 327/156 |
| 2004/0107781 | A1 | * | 6/2004 | Asaumi et al. | ........... 73/862.333 |
| 2005/0176543 | A1 | | 8/2005 | Kirkwood et al. | |

(Continued)

OTHER PUBLICATIONS

U.S. Appl. No. 12/548,042, filed Aug. 26, 2009, Randall B. Dlugoss.

*Primary Examiner* — Redhwan k Mawari

(57) ABSTRACT

A control system may include a polarity determination module, a torque variation module, and a torque sensor diagnostic module. The polarity determination module determines a first polarity of a torque signal that indicates a transmission torque. The torque sensor diagnostic module diagnoses an error of a torque sensor when an detected polarity of the torque signal is opposite from the first polarity. A control system may include a torque variation module and a torque sensor diagnostic module. The torque variation module determines a maximum torque variation during a predetermined diagnostic period based on the torque signal. The torque sensor diagnostic module diagnoses an error of a torque sensor when the maximum torque variation is outside of a torque variation range. The torque variation range is defined by a minimum torque variation threshold and a maximum torque variation threshold.

9 Claims, 5 Drawing Sheets

U.S. PATENT DOCUMENTS

| | | |
|---|---|---|
| 2006/0142924 A1 | 6/2006 | Nakagawa et al. |
| 2006/0154783 A1 | 7/2006 | Petzold et al. |
| 2006/0189432 A1* | 8/2006 | Tsuchiya et al. .............. 475/216 |
| 2006/0199697 A1 | 9/2006 | Kirkwood et al. |
| 2008/0125929 A1 | 5/2008 | Prokohrov |
| 2009/0076679 A1* | 3/2009 | Martini et al. .................. 701/34 |
| 2010/0161197 A1 | 6/2010 | Moeckley et al. |
| 2010/0274443 A1* | 10/2010 | Dlugoss ......................... 701/34 |

* cited by examiner

TORQUE SENSOR PERFORMANCE DIAGNOSTIC SYSTEMS AND METHODS

CROSS-REFERENCE TO RELATED APPLICATIONS

This application claims the benefit of U.S. Provisional Application No. 61/171,625, filed on Apr. 22, 2009. This application is related to U.S. patent application Ser. No. 12/548,042 filed on Aug. 26, 2009. The disclosures of the above applications are incorporated herein by reference in their entirety.

FIELD

The present disclosure relates to vehicle diagnostic systems, and more particularly to torque sensor diagnostic systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A powertrain for a vehicle may include an internal combustion engine that generates drive torque. Air is drawn into a cylinder of the engine and mixed with fuel to form a combustion mixture. The combustion mixture is compressed within the cylinder and is combusted to drive a piston within the cylinder. Reciprocating motion of the piston rotates a crankshaft of the engine to produce drive torque.

Torque sensors may be used in numerous applications in the vehicle, such as to measure drive and brake torque and steering-wheel torque. The torque sensors may measure rotational torque. For example, an engine crankshaft or a transmission axle may produce a rotational output torque that can be measured by a torque sensor. Outputs of the torque sensors may be used for engine and/or transmission control.

SUMMARY

In one embodiment, a control system is provided and includes a polarity determination module, a torque variation module, and a torque sensor diagnostic module. The polarity determination module determines a first polarity of a torque signal that indicates a transmission torque. The torque sensor diagnostic module diagnoses an error of a torque sensor when an detected polarity of the torque signal is opposite from the first polarity In other features, a control system is provided and includes a torque variation module and a torque sensor diagnostic module. The torque variation module determines a maximum torque variation during a predetermined diagnostic period based on the torque signal. The torque sensor diagnostic module diagnoses an error of a torque sensor when the maximum torque variation is outside of a torque variation range. The torque variation range is defined by a minimum torque variation threshold and a maximum torque variation threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
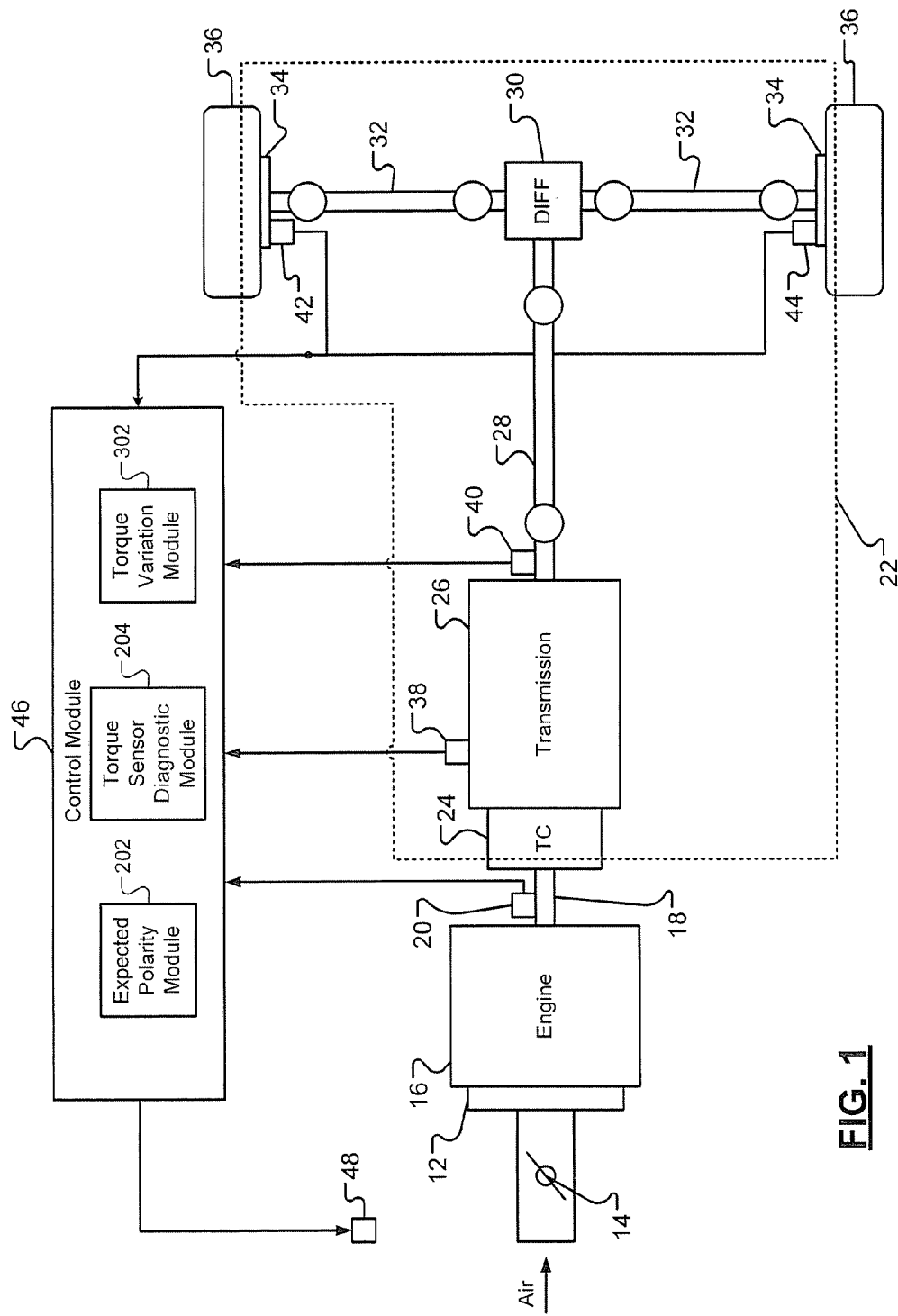
FIG. 1 is a schematic and functional block diagram of a vehicle system according to an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In addition, although the following embodiments are described primarily with respect to a spark ignition direct injection (SIDI) engine, the embodiments of the present disclosure may apply to other types of engines. For example, the present invention may apply to compression ignition, spark ignition, spark ignition direct injection, homogenous spark ignition, homogeneous charge compression ignition, stratified spark ignition, diesel, and spark assisted compression ignition engines.

A torque sensor diagnostic system may diagnose an error of a torque sensor. An error may be detected when a torque signal generated by the torque sensor is outside of an operating range defined by a first (lower) threshold and a second (upper) threshold. In some cases, the torque signal may be within the operating range and have an actual (detected) polarity that is opposite that of an expected (predetermined) polarity. An error may not be detected until the torque signal is outside of the operating range due to the difference in the actual and expected polarities.

A torque sensor diagnostic system may also diagnose an error of a toque sensor based on a torque signal that has been filtered to remove noise and signal fluctuations due to vehicle acceleration and/or changes in engine torque. A torque sensor may experience intermittent errors may occur due to erratic operation of the torque sensor and/or loose wires and/or signal noise of the torque sensor. The intermittent errors may not be diagnosed, for example, due to their short duration.

A service indicator may be activated when an error is diagnosed and deactivated when an error is not detected for a predetermined period and/or for an ignition cycle. An ignition cycle refers to a period from when an ignition system (not shown) is activated to when the ignition system is disabled. The ignition cycle may be associated with a key or push button start of an engine.

Torque sensor diagnostic techniques of the present disclosure include diagnosis of a torque sensor when actual and expected polarities of the torque sensor are inconsistent. Torque sensor diagnostic techniques of the present disclosure also provide for the detection and diagnosis of intermittent errors. Diagnosing an error of the torque sensor may include diagnosing a fault of the torque sensor and/or diagnosing a malfunction of the torque sensor.

Referring now to FIG. 1, a vehicle system 10 is schematically illustrated in accordance with the present disclosure. Air is drawn into an intake manifold 12 through a throttle valve 14. Air within the intake manifold 12 is mixed with fuel and distributed into cylinders (not shown) of an engine 16.

The cylinders drive a crankshaft 18 of the engine 16 to produce drive torque. The crankshaft 18 rotates at an engine speed or a rate that is proportional to the engine speed. The vehicle system 10 may include a crankshaft position sensor 20 that senses a position of the crankshaft 18 and generates a crankshaft position signal.

The crankshaft 18 of the engine 16 drives a drivetrain system 22. The drivetrain system 22 includes a flexplate or flywheel (not shown), a torque converter or other coupling device 24, a transmission 26, a drive shaft 28, a differential 30, axle shafts 32, brakes 34, and driven wheels 36. Propulsion torque that is output at the crankshaft 18 of the engine 16 is transferred through the drivetrain system components to provide axle torque at the axle shafts 32 to drive the wheels 36. Rotational movement of the torque converter 24, the transmission 26, and the differential 30 amplifies propulsion torque by several gear ratios to provide axle torque at the axle shafts 32.

A transmission mode sensor 38 senses a mode selected in the transmission 26 (e.g., park, reverse, neutral, drive, gear selection) and generates a transmission mode signal. The transmission modes are further described below. A torque sensor 40 may measure output torque of the transmission 26 to generate a torque signal. As an alternative, the torque sensor 40 may measure output torque of the crankshaft 18. Additional torque sensors may also be included.

A vehicle speed sensor 42 detects rotational speeds of the wheels 36 and generates a vehicle speed signal. A brake level sensor 44 detects a brake level applied to the wheels 36 and generates a brake level signal. The vehicle speed sensor 42 and the brake level sensor 44 may be located at one or both of the wheels 36. Vehicle speed sensors may also be located within the drivetrain system 22 and at other locations in the vehicle system 10 from which a vehicle speed may be determined.

A control module 46 receives the torque signal from the torque sensor 40 and diagnoses the torque sensor 40 based thereon. The control module 46 may receive additional signals, including the transmission mode signal, the vehicle speed signal, and the brake level signal. The control module 46 may detect errors associated with the torque sensor 40 based on the torque signal and the additional signals. The control module 46 may activate a service indicator 48 when an error of the torque sensor 40 is detected.

The control module 46 may include an expected polarity module 202, a torque sensor diagnostic module 204, and a torque variation module 302. The expected polarity module 202 may determine an expected polarity of the torque signal from the torque sensor 40 based on the transmission mode signal and the vehicle speed signal. The torque sensor diagnostic module 204 may diagnose an error of the torque sensor 40 based on the expected polarity from the expected polarity module 202. Detection of an error of the torque sensor 40 based on polarities enables rapid diagnosis and redundancy of diagnosis.

The torque variation module 302 may determine a maximum torque variation during a predetermined diagnostic period based on the torque signal. The maximum torque variation is a difference between a maximum torque and a minimum torque detected during the predetermined diagnostic period. The maximum torque variation is used to measure signal noise, vehicle acceleration, and engine torque fluctuation.

The torque sensor diagnostic module 204 may diagnose an error of the torque sensor 40 when the maximum torque variation is outside of a torque variation range. The torque variation range is defined by a maximum torque variation threshold and a minimum torque variation threshold. Diagnosing an error based on torque variation enables detection of an error that occurs briefly (i.e., at a high frequency) and/or intermittently.

Figure 2:
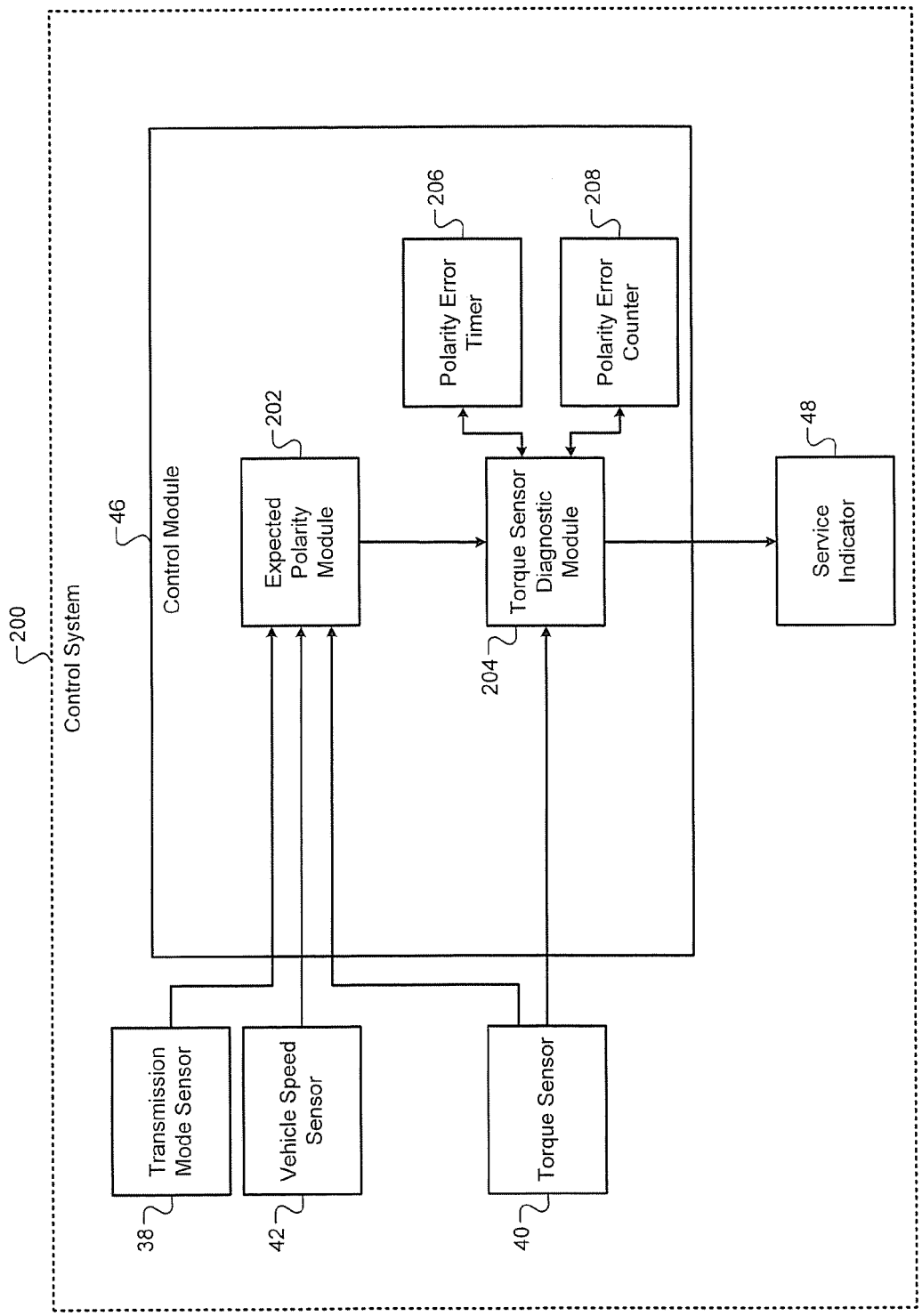
FIG. 2 is a functional block diagram of a control system according to an embodiment of the present disclosure.

Referring now also to FIG. 2, a control system 200 is shown and includes the control module 46. The control module 46 may include the expected polarity module 202, the torque sensor diagnostic module 204, a polarity error timer 206, and a polarity error counter 208. Although shown as separate modules, the polarity error timer 206 and the polarity error counter 208 may be part of the torque sensor diagnostic module 204. The control system 200 may also include the transmission mode sensor 38, the vehicle speed sensor 42, and the torque sensor 40. The expected polarity module 202 receives the transmission mode signal, the vehicle speed signal and the torque signal from the sensors 38, 40, 42.

The transmission mode signal indicates modes of the transmission 26, such as a park mode, a reverse mode, a neutral mode, a drive mode, and a gear selection or low gear mode. The transmission 26 does not transfer torque to the drive shaft 28 when the transmission 26 is in the park mode or the neutral mode. The transmission 26 transfers torque in a first angular direction when the transmission 26 is in the reverse mode and transfers torque in a second angular direction that is opposite from the first angular direction when the transmission 26 is in the drive mode or the low gear mode.

The expected polarity module 202 determines the expected polarity of the torque signal based on the transmission mode signal. The expected polarity in the drive mode or the low gear mode is opposite that when in the reverse mode. For example only, the expected polarity module 202 may determine that the expected polarity is positive when the transmission 26 is in the drive mode or the low gear mode. The expected polarity module 202 may determine that the expected polarity is negative when the transmission 26 is in the reverse mode. Expected and actual polarities described herein are provided as examples and may be opposite than that stated.

The expected polarity module 202 may refrain from determination of the expected polarity under certain conditions based on the vehicle speed signal and the torque signal. For example, the expected polarity module 202 may refrain from determining the expected polarity when the vehicle speed is less than a vehicle speed threshold. This prevents expected polarity determination at low speeds when the torque signal may exhibit increased noise levels.

As another example, the expected polarity module 202 may not determine the expected polarity when the transmission torque is less than a transmission torque threshold. This prevents expected polarity determination during low torque periods when the predictability of the expected polarity may be reduced due to frequent polarity changes. The expected polarity determination may also not be determined when the transmission 26 is in the park mode and/or the neutral mode.

The torque sensor diagnostic module 204 receives the torque signal from the torque sensor 40 and an expected polarity signal from the expected polarity module 202. The torque sensor diagnostic module 204 compares the actual polarity to an expected polarity indicated by the expected polarity signal. The torque sensor diagnostic module 204 may diagnose an error of the torque sensor 40 when the actual polarity is opposite from the expected polarity.

The torque sensor diagnostic module 204 initiates the polarity error timer 206 when the actual polarity is opposite from the expected polarity. The torque sensor diagnostic module 204 increments the polarity error counter 208 when the polarity error timer 206 is equal to a predetermined error period. The torque sensor diagnostic module 204 may diagnose an error of the torque sensor 40 when the polarity error counter 208 is greater than an error cycle count threshold.

The predetermined error period may be based on a response time of the torque sensor diagnostic module 204 associated with receiving the torque signal and with comparing the actual polarity to the expected polarity. The predetermined error period may be equal to the response time plus a confidence factor (e.g., 50% of the predetermined error period) that prevents false diagnosis of an error. This ensures that the actual and expected polarities are compared at least two times before an error is diagnosed. The predetermined error period may remain constant or decrease when the vehicle speed and/or the transmission torque increase, reducing a possibility of a false error diagnosis.

The torque sensor diagnostic module 204 may activate the service indicator 48 when the error of the torque sensor 40 is diagnosed. Activating the service indicator 48 may involve setting a diagnostic trouble code (DTC). An on-board diagnostic scan tool may be used to detect the DTC. Activating the service indicator 48 may involve activating a visual indicator such as a display. Activating the service indicator 48 may involve generating an audible message that notifies a vehicle operator or technician to service the vehicle system 10 and/or to service the torque sensor 40.

The torque sensor diagnostic module 204 may reset and initiate the polarity error timer 206 when the actual polarity is equal to the expected polarity. The torque sensor diagnostic module 204 may decrement the polarity error counter 208 when the polarity error timer 206 is equal to a predetermined non-error period and the polarity error counter 208 is greater than zero. In addition, the torque sensor diagnostic module 204 may deactivate the service indicator 48 when the actual polarity is equal to the expected polarity for an ignition cycle.

The predetermined non-error period may be equal to the predetermined error period plus a confidence factor to prevent decrementing of the polarity error counter 208 when an error is present. The confidence factor may be determined during vehicle development and fixed during customer operation. For example, the confidence factor may be determined during vehicle development based on an average measured period between ignition cycles and/or based on a measured period between errors of a torque sensor.

Figure 3:
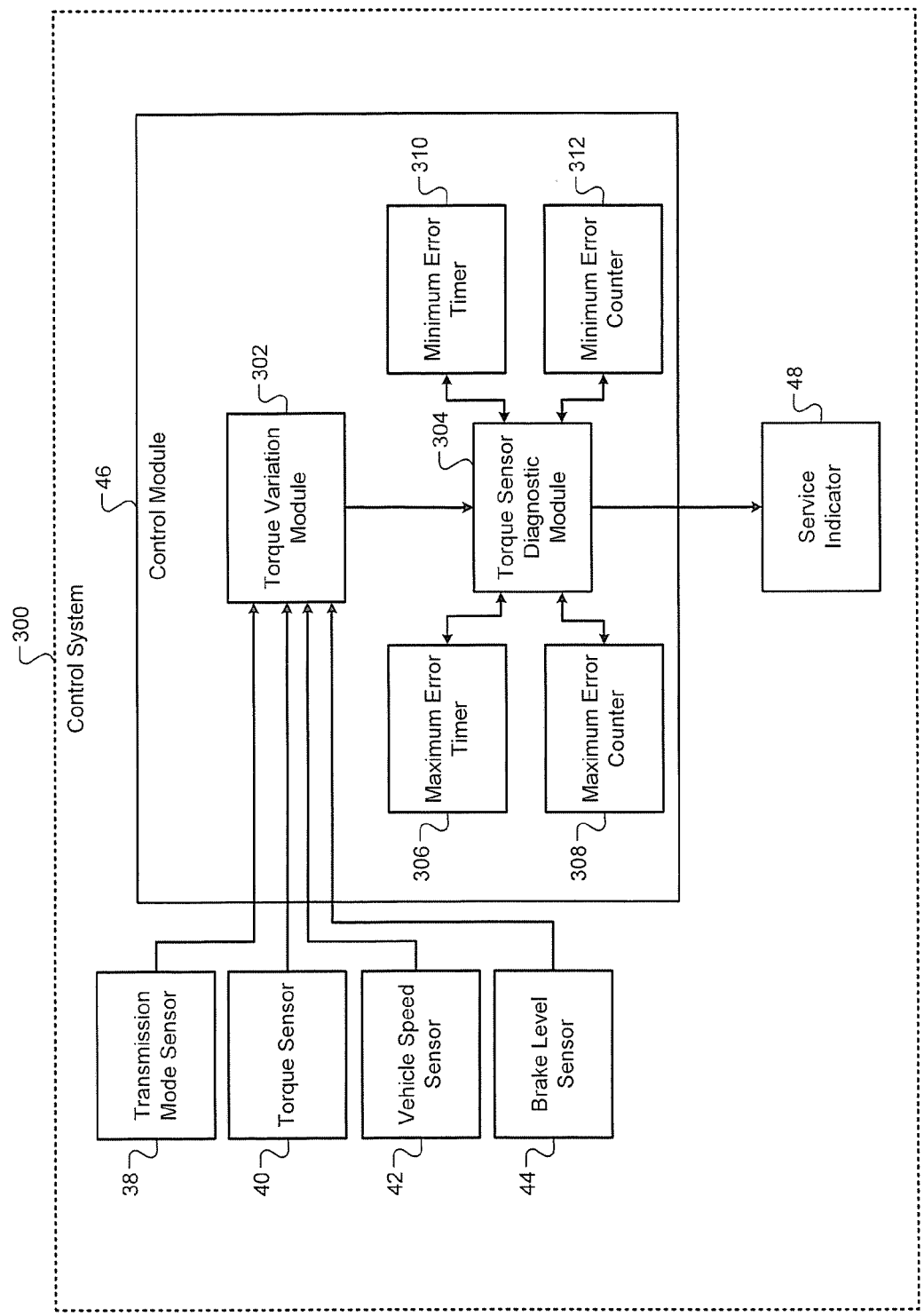
FIG. 3 is a functional block diagram of a control system according to another embodiment of the present disclosure.

Referring now to FIGS. 1 and 3, a control system 300 is shown and includes the control module 46. The control module 46 may include the torque variation module 302, a torque sensor diagnostic module 304, a maximum error timer 306, a maximum error counter 308, a minimum error timer 310, and a minimum error counter 312. Although shown as separate modules, the timers 306, 310 and the counters 308, 312 may be part of the torque sensor diagnostic module 304.

The control system 300 may also include the transmission mode sensor 38, the torque sensor 40, the vehicle speed sensor 42, and the brake level sensor 44. The torque variation module 302 receives the transmission mode signal, the torque signal, the vehicle speed signal and the brake level signal from the sensors 38, 40, 42, 44.

The torque variation module 302 selectively determines the maximum torque variation during a predetermined diagnostic period based on the transmission mode signal, the torque signal, the vehicle speed signal, and the brake level signal. The torque variation module 302 may determine the maximum torque variation based on a transmission torque that is indicated by the torque signal.

The torque variation module 302 may refrain from determining the maximum torque variation based on the transmission mode signal and the brake level signal. For example, the maximum torque variation may not be determined when the transmission mode signal indicates that the transmission 26 is shifting gears. As another example, the maximum torque variation may not be determined when the brake level signal indicates that the brake level exceeds a brake level threshold.

The torque variation module 302 may also refrain from determining the maximum torque variation when vehicle acceleration exceeds a vehicle acceleration threshold. The torque variation module 302 may determined the vehicle acceleration based on the vehicle speed signal.

The torque sensor diagnostic module 304 receives a maximum torque variation signal from the torque variation module 302. The torque sensor diagnostic module 304 determines whether a maximum torque variation indicated by the maximum torque variation signal is within a torque variation range. The torque sensor diagnostic module 304 may diagnose an error of the torque sensor 40 when the maximum torque variation is outside of the torque variation range.

The torque variation range is defined by a maximum torque variation threshold and a minimum torque variation threshold. The maximum and minimum torque variation thresholds may be determined during vehicle calibration and fixed during customer operation. The maximum and minimum torque variation thresholds may be based on a torque variation range measured during steady-state vehicle operation, when fluctuations in the torque signal are not likely to occur. Fluctuations in the torque signal may occur during a transmission shift, during peak vehicle accelerations, during rough road conditions, and during heavy braking.

The torque sensor diagnostic module 304 determines whether the maximum torque variation is outside of the torque variation range. The torque sensor diagnostic module 304 initiates the maximum error timer 306 when the maximum torque variation is greater than the maximum torque variation threshold (i.e., outside of the torque variation range). The torque sensor diagnostic module 304 increments the maximum error counter 308 when a time of the maximum error timer 306 is equal to a predetermined error period. The torque sensor diagnostic module 304 diagnoses the error of the torque sensor 40 when a count of the maximum error counter 308 is greater than an error cycle count threshold.

The torque sensor diagnostic module 304 may reset and initiate the maximum error timer 306 when the maximum torque variation is less than or equal to the maximum torque variation threshold (i.e., within the torque variation range). The torque sensor diagnostic module 304 may decrement the maximum error counter 308 when the time of the maximum error timer 306 is equal to the predetermined non-error period and count of the maximum error counter 308 is greater than zero.

The torque sensor diagnostic module 304 initiates the minimum error timer 310 when the maximum torque variation is less than the minimum torque variation threshold (i.e., outside of the torque variation range). The torque sensor diagnostic module 304 increments the minimum error counter 312 when the time of the minimum error timer 310 is equal to the predetermined error period. The torque sensor diagnostic module 304 may diagnose the error of the torque sensor 40 when the count of the minimum error counter 312 is greater than the error cycle count threshold.

The torque sensor diagnostic module 304 may reset and initiate the minimum error timer 310 when the maximum torque variation is greater than or equal to the minimum torque variation threshold (i.e., within the torque variation range). The torque sensor diagnostic module 304 may decrement the minimum error counter 312 when the time of the minimum error timer 310 is equal to the predetermined non-error period and the count of the minimum error counter 312 is greater than zero.

The predetermined error period may be set to allow for diagnosis of an intermittent error of the torque sensor 40. For example only, an intermittent error may have an associated period of less than one second. The predetermined error period may be based on a sampling period of the torque sensor 40. In addition, the predetermined error period may be based on a period of a diagnostic cycle. A diagnostic cycle may include determining the maximum torque variation, comparing the maximum torque variation to the torque variation range, and diagnosing an error of the torque sensor based on the comparison.

The predetermined non-error period may be set such that the torque sensor diagnostic module 304 may diagnose an error of the torque sensor 40 that occurs intermittently. The predetermined non-error period may be determined during vehicle development and fixed during customer operation. For example, the predetermined non-error period may be determined during vehicle development based on an average measured period between ignition cycles and/or based on a measured period between errors of a torque sensor.

The torque sensor diagnostic module 304 may activate the service indicator 48 when an error of the torque sensor 40 is diagnosed. In addition, the torque sensor diagnostic module 304 may deactivate the service indicator 48 when the maximum torque variation is within the torque variation range for a predetermined number of ignition cycles. Deactivating the service indicator 48 after multiple ignition cycles enables diagnosis of an error that occurs intermittently during multiple ignition cycles.

Figure 4:
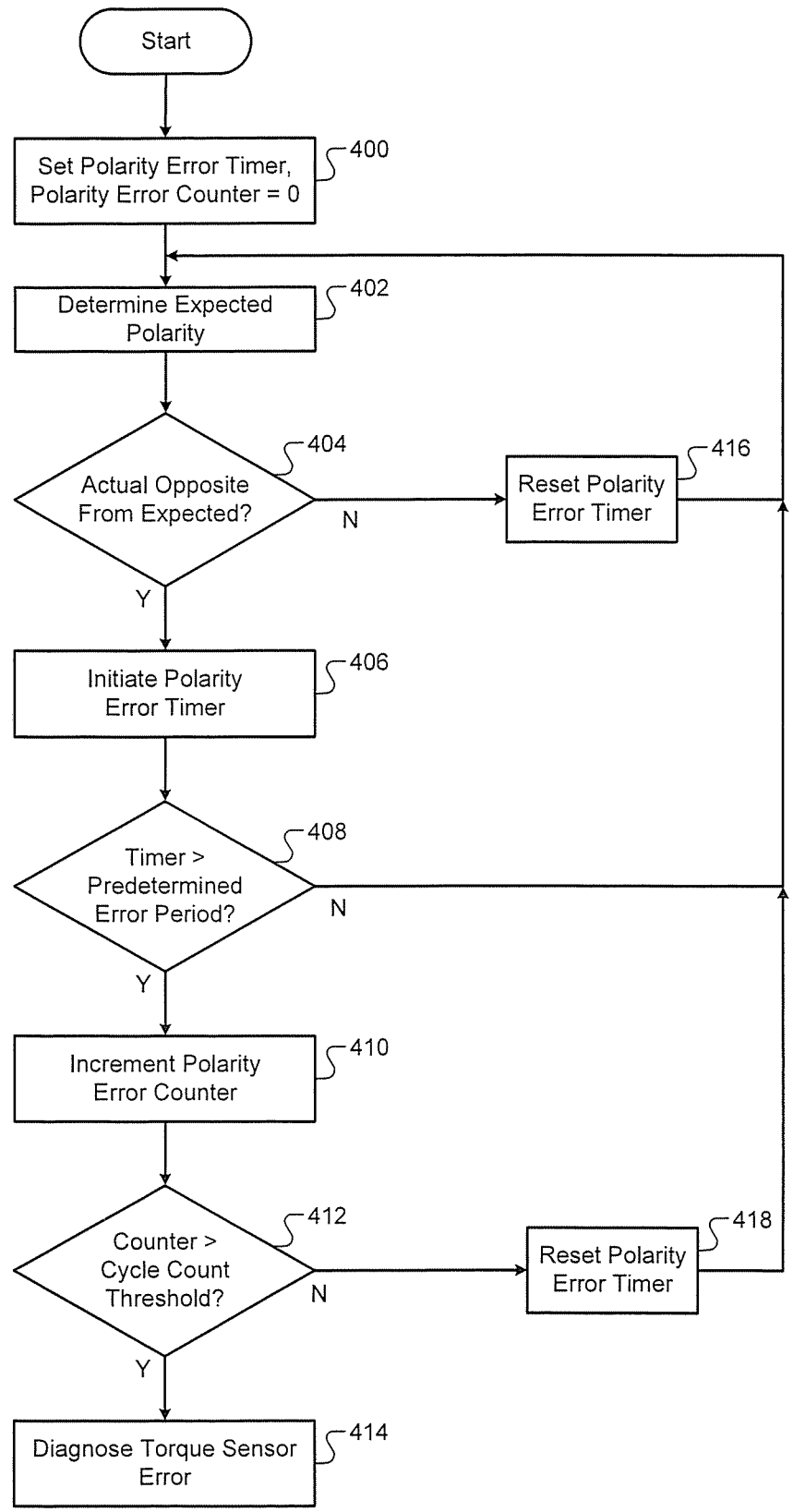
FIG. 4 illustrates a torque sensor diagnostic method according to an embodiment of the present disclosure.

Referring now to FIG. 4, exemplary steps of a torque sensor diagnostic method corresponding to the control system of FIG. 2 are illustrated. In step 400, control sets a polarity error timer value and a polarity error counter value equal to zero. The polarity error timer value and the polarity error counter value may be parameters within a control algorithm and/or be associated with physical timer and counter hardware. In step 402, control determines the expected polarity of a torque signal.

In step 404, control determines whether an actual polarity of the torque signal is opposite the expected polarity. Control resets the polarity error timer value (i.e., sets the polarity error timer value equal to zero) in step 416 and returns to step 402 when the actual polarity is equal to the expected polarity. Control initiates the polarity error timer value in step 406 and determines whether the polarity error timer value is greater than a predetermined error period in step 408 when the actual polarity is opposite from the expected polarity. Control returns to step 402 when the polarity error timer value is less than or equal to the predetermined error period.

Control increments the polarity error counter value in step 410 when the polarity error timer value is greater than the predetermined error period. In step 412, control determines whether the polarity error counter value is greater than an error cycle count threshold. Control resets the polarity error timer value in step 418 and returns to step 402 when the polarity error counter value is less than or equal to the error cycle count threshold. Control diagnoses an error of the torque sensor 40 in step 414 when the polarity error counter value is greater than the error cycle count threshold.

Control may decrement the polarity error counter value when the actual polarity is equal to the expected polarity for a predetermined non-error period and the polarity error counter value is greater than zero. The predetermined non-error period may be greater than the predetermined error period. Control may determine that an error of the torque sensor 40 does not exist when the actual polarity is the same as the expected polarity for an ignition cycle.

Figure 5:
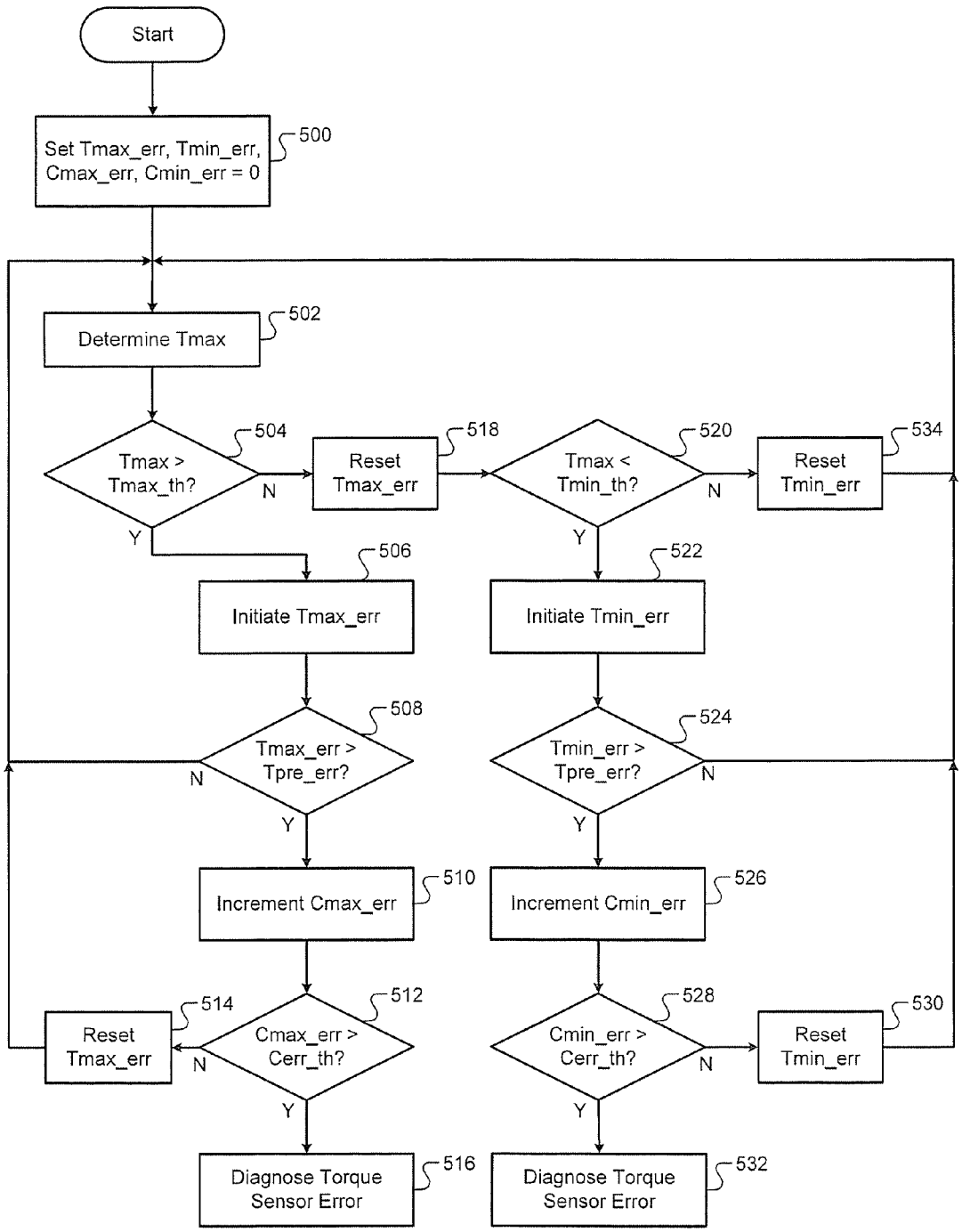
FIG. 5 illustrates a torque sensor diagnostic method according to another embodiment of the present disclosure.

Referring now to FIG. 5, exemplary steps of a torque sensor diagnostic method corresponding to the control system of FIG. 2 are illustrated. In step 500, control sets values of a maximum error timer $T_{max\_err}$, a minimum error timer $T_{min\_err}$, a maximum error counter $C_{max\_err}$, and a minimum error counter $C_{min\_err}$ equal to zero. The maximum error timer, minimum error timer, maximum error counter, and minimum error counter values may be parameters within a control algorithm and/or be associated with physical timer and counter hardware.

In step 502, control determines a maximum torque variation $T_{max}$ based on the torque signal during the predetermined diagnostic period. Control may determine the maximum torque variation during steady-state vehicle operation and may refrain from determining the maximum torque variation when fluctuations in the torque signal may occur.

In step 504, control determines whether the maximum torque variation is greater than the maximum torque variation threshold $T_{max\_th}$. Control initiates the maximum error timer in step 506 and determines whether the maximum error timer value is greater than the predetermined error period $T_{pre\_err}$ in step 508 when the maximum torque variation is greater than the maximum torque variation threshold. Control returns to step 502 when the maximum error timer value is less than or equal to the predetermined error period.

Control increments the maximum error counter in step 510 and determines whether the maximum error counter value is greater than the error cycle count threshold $C_{err\_th}$ in step 512 when the maximum error timer value is greater than the predetermined error period. Control resets the maximum error timer in step 514 and starts a new diagnostic cycle by returning to step 502 when the maximum error counter value is less than or equal to the error cycle count threshold. Control diagnoses an error of the torque sensor 40 in step 516 when the maximum error counter value is greater than the error cycle count threshold.

Referring again to step 504, control resets the maximum error timer in step 518 and proceeds to step 520 when the maximum torque variation is less than or equal to the maximum torque variation threshold. Control may decrement the maximum error counter when the maximum error counter value is greater than zero and the maximum torque variation is less than or equal to the maximum torque variation threshold for the predetermined non-error period. The predetermined non-error period may be sufficient in length such that decrementing the maximum error counter does not prevent diagnosis of an intermittent error of the torque sensor 40.

In step 520, control determines whether the maximum torque variation is less than a minimum torque variation threshold $T_{min\_th}$. Control initiates the minimum error timer in step 522 and determines whether the minimum error timer value is greater than the predetermined error period in step 524 when the maximum torque variation is less than the minimum torque variation threshold. Control returns to step 502 when the minimum error timer value is less than or equal to the predetermined error period.

Control increments the minimum error counter in step 526 and determines whether the minimum error counter value is greater than the error cycle count threshold in step 528 when the minimum error timer value is greater than the predetermined error period. Control resets the minimum error timer in step 530 and starts a new intermittent error diagnostic cycle by returning to step 502 when the minimum error counter value is less than or equal to the error cycle count threshold. Control diagnoses an error of the torque sensor 40 in step 532 when the minimum error counter value is greater than the error cycle count threshold.

Referring again to step 520, control resets the minimum error timer in step 534 and returns to step 502 when the maximum torque variation is greater than or equal to the minimum torque variation threshold. Control may decrement the minimum error counter when the minimum error counter value is greater than zero and the maximum torque variation is greater than or equal to the minimum torque variation threshold for the predetermined non-error period. The predetermined non-error period may be sufficient in length such that decrementing the minimum error counter does not prevent diagnosis of an intermittent error of the torque sensor 40.

The above-described steps of FIGS. 4 and 5 are meant to be illustrative examples; the steps may be performed sequentially, synchronously, simultaneously, continuously, during overlapping time periods or in a different order depending upon the application.

A torque sensor diagnostic system according to the present disclosure may include the modules described with respect to the embodiments of FIGS. 2 and 3. For example, a torque sensor diagnostic system according to the present disclosure may include the expected polarity module 202, the torque variation module 302, and the torque sensor diagnostic modules 204, 304. Alternatively, a torque sensor diagnostic system according to the present disclosure may include the expected polarity module 202, the torque variation module 302, and a single torque sensor diagnostic module. The single torque diagnostic module may diagnose an error of the torque sensor 40 based on the expected polarity of the torque signal and the maximum torque variation of the torque signal during the predetermined diagnostic period.

The torque sensor diagnostic system may also include, for example, the transmission mode sensor 38, the torque sensor 40, the vehicle speed sensor 42, and the brake level sensor 44. The torque sensor diagnostic system may diagnose an error of the torque sensor 40 based on a torque signal generated by the torque sensor 40 and refrains from diagnosing an error of the torque sensor 40 based on signals generated by the transmission mode sensor 38, the vehicle speed sensor 42, and the brake level sensor 44.

A torque sensor diagnostic method according to the present disclosure may include a combination of the steps described with respect to the embodiments of FIGS. 4 and 5. For example, a torque sensor diagnostic method according to the present disclosure may determine an expected polarity and determine a maximum torque variation as disclosed above in steps 402 and 502, respectively. The torque sensor diagnostic method may include: determination of whether the actual polarity is opposite the expected polarity; determination of whether the maximum torque variation is greater than a maximum torque variation threshold; and determination of whether the maximum torque variation is less than a minimum torque variation threshold, as disclosed in steps 404, 504 and 520.

The torque sensor diagnostic method may selectively diagnose an error of the torque sensor 40 when the conditions disclosed in steps 414, 516, and 532 are satisfied. An error of the torque sensor 40 may be diagnosed when actual polarity is opposite the expected polarity. An error of the torque sensor 40 may be diagnosed when the maximum torque variation is greater than the maximum torque variation threshold. An error of the torque sensor 40 may be diagnosed when the maximum torque variation is less than the minimum torque variation threshold.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
   a polarity determination module that determines an expected polarity of a torque signal of a torque sensor that indicates a torque of a transmission; and
   a torque sensor diagnostic module that diagnoses an error of the torque sensor when a detected polarity of said torque signal is opposite from said expected polarity.

2. The control system of claim 1, wherein said polarity determination module determines said expected polarity based on at least one of a transmission mode signal, a vehicle speed signal, and said torque signal.

3. The control system of claim 2, wherein said transmission mode signal indicates a mode of said transmission, wherein said transmission operates in one of a park mode, a reverse mode, a neutral mode, a drive mode, and a gear mode.

4. The control system of claim 3, wherein said polarity determination module determines that said expected polarity is a first polarity when said transmission is in said reverse mode, and
   wherein said polarity determination module determines that said first polarity is a second polarity when said transmission is in one of said drive mode and said gear mode, where said second polarity is opposite said first polarity.

5. The control system of claim 3, wherein said polarity determination module refrains from determining said expected polarity when said transmission is in one of said park mode and said neutral mode.

6. The control system of claim 2, wherein said polarity determination module refrains from determining said expected polarity when said vehicle speed signal is less than a vehicle speed threshold.

7. The control system of claim 2, wherein said polarity determination module refrains from determining said expected polarity when said torque signal is less than a transmission torque threshold.

8. The control system of claim 1, further comprising:
   a polarity error timer that increments a time when said detected polarity is opposite from said expected polarity; and
   a polarity error counter that increments a cycle count when said time is greater than a predetermined period.

9. The control system of claim 8, wherein said torque sensor diagnostic module diagnoses said error of said torque sensor when said cycle count is greater than a cycle count threshold.

* * * * *